United States Patent
Bikson et al.

(10) Patent No.: US 10,780,392 B2
(45) Date of Patent: Sep. 22, 2020

(54) MULTI-STAGE MEMBRANE FOR N2 REJECTION

(71) Applicant: Air Liquide Advanced Technologies U.S. LLC, Houston, TX (US)

(72) Inventors: Benjamin Bikson, Brookline, MA (US); Yong Ding, Waban, MA (US); Michael J. Mitariten, Pittstown, NJ (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 177 days.

(21) Appl. No.: 15/959,816

(22) Filed: Apr. 23, 2018

(65) Prior Publication Data
US 2019/0321780 A1  Oct. 24, 2019

(51) Int. Cl.
| | |
|---|---|
| *B01D 53/75* | (2006.01) |
| *B01D 53/54* | (2006.01) |
| *B01D 53/62* | (2006.01) |
| *B01D 53/72* | (2006.01) |
| *B01D 71/60* | (2006.01) |

(Continued)

(52) U.S. Cl.
CPC ......... *B01D 53/75* (2013.01); *B01D 53/0407* (2013.01); *B01D 53/54* (2013.01); *B01D 53/62* (2013.01); *B01D 53/72* (2013.01); *B01D 71/60* (2013.01); *B01D 71/64* (2013.01); *B01D 71/68* (2013.01); *B01D 71/82* (2013.01); *B01D 2257/102* (2013.01); *B01D 2257/504* (2013.01); *B01D 2257/708* (2013.01); *B01D 2257/80* (2013.01); *B01D 2258/05* (2013.01); *B01D 2325/02* (2013.01)

(58) Field of Classification Search
None
See application file for complete search history.

(56) References Cited

U.S. PATENT DOCUMENTS

| | | |
|---|---|---|
| 5,647,227 A | 7/1997 | Lokhandwala |
| 5,776,990 A | 7/1998 | Hedrick et al. |

(Continued)

OTHER PUBLICATIONS

Brinkmann et al., "Pilot scale investigations of the removal of carbon dioxide from hydrocarbon gas streams using poly(ethylene oxide)-poly(butylene terephthalate) PolyActive™) thin film composite membranes", Journal of Membrane Sciene 489 (2015) 237-247. (Year: 2015).*
Delgado, et al., "Numerical simulation of a three-bed PSA cycle for the methane/nitrogen separation with silicalite," Separation and Purification Technology 77 (2011) p. 7-17.
Jiang, et al., "Silicone-coated polymeric membrane for separation of hydrocarbons and nitrogen at sub-ambient temperatures," Journal of Membrane Science 286 (2006) pp. 285-292.

(Continued)

*Primary Examiner* — Anita Nassiri-Motlagh
(74) *Attorney, Agent, or Firm* — Christopher J. Cronin (57) ABSTRACT

Nitrogen is removed from biogas using a three-stage separation system based on gas separation membranes. The first stage separates a biomethane feed stream into a first permeate gas stream and a first retentate gas stream. The second stage separates the first permeate stream into a biomethane product gas and a first low quality biomethane gas stream. The third stage separates the first retentate into a second low quality biomethane gas stream and a waste gas. A biogas feed stream is pretreated to remove amounts of water, VOCs, and $CO_2$ to yield a methane-enriched biogas stream. The methane-enriched biogas stream is compressed together with the first and second low quality biomethane gas streams to form the biomethane feed stream.

29 Claims, 2 Drawing Sheets

(51) Int. Cl.
*B01D 71/64* (2006.01)
*B01D 71/68* (2006.01)
*B01D 71/82* (2006.01)
*B01D 53/04* (2006.01)

(56) References Cited

U.S. PATENT DOCUMENTS

| | | | |
|---|---|---|---|
| 5,964,923 | A | 10/1999 | Lokhandwala |
| 6,572,678 | B1 | 6/2003 | Wijmans et al. |
| 6,630,011 | B1 * | 10/2003 | Baker ............... B01D 53/225 95/47 |
| 6,860,920 | B2 | 3/2005 | Simmons |
| 8,211,211 | B1 | 7/2012 | Knaebel |
| 8,999,038 | B2 | 4/2015 | Ungerank et al. |
| 2007/0125537 | A1 | 6/2007 | Lokhandwala et al. |
| 2007/0272079 | A1 | 11/2007 | Malsam et al. |
| 2011/0120304 | A1 * | 5/2011 | Peinemann ........ B01D 67/0011 95/45 |
| 2018/0133660 | A1 * | 5/2018 | Shangguan ............. C07C 17/38 |

OTHER PUBLICATIONS

Lokhandwala, et al., "Membrane separation of nitrogen from natural gas; A case study from membrane synthesis to commercial deployment," Journal of Membrane Science 346 (2010) pp. 270-279.

Lokhandwala, et al, "Nitrogen Removal from Natural Gas—Phase II Draft Final Report," Membrane Technology Research, Inc., Dec. 22, 1999, 50 pgs.

"Nitrogen Removal from Natural Gas—Topical Report," Membrane Technology and Research, Inc. Sep. 29, 2995-Sep. 30, 1996, 49 pgs.

Meyer, et al., "Methane Selective Membranes for Nitrogen Removal from Low Quality Natural Gas—High Permeation is Not Enough," Gas Technology Institute and University of Massachusetts, 10 pgs.

Mitariten, Michael, "Economic N2 Removal," Reprinted from Hydrocarbon Engineering, Jul. 2004, 4 pgs.

Mokhatab, et al., "Controlling the hydrocarbon dew point of pipeline gas," www.eptq.com, PTQ Q3 2017, pp. 109-116.

SoCalGas, "Renewable Natural Gas (RNG) Gas Quality Standards," www.socalgas.com/rg, 2 pgs.

* cited by examiner

MULTI-STAGE MEMBRANE FOR N2 REJECTION

FIELD OF THE INVENTION

The invention pertains to a method for removal of nitrogen from biogas using a multi-stage gas separation membrane system.

BACKGROUND OF THE INVENTION

Landfill gas contains methane and impurities such as $H_2O$, siloxanes, $H_2S$, volatile organic compounds (VOCs) and air ($N_2$, and $O_2$). It is desirable to remove the impurities, so that high purity methane is produced for sales. Technologies of adsorption, and gas separation membranes, either alone or in combination, are commercially applied to remove the $H_2O$, siloxanes, $H_2S$, $O_2$ and VOCs. However, the $N_2$ within the landfill gas is not removed in these methods or systems, and remains at high pressure with the methane product. This residual nitrogen lowers the purity and heating value of the final methane product.

The U.S. pipeline specification for natural gas requires the total inert content—predominately nitrogen—to be less than 4 vol %. Fourteen percent of known U.S. natural gas reserves contain more than 4 vol % nitrogen and, therefore, do not meet this specification. Many of these high-nitrogen gas streams can be diluted with low-nitrogen gas to meet the specification. If dilution is not practical, a nitrogen removal unit such as cryogenic distillation must be installed. However, cryogenic plants are most suited to large gas fields that can deliver 50-500 million scfd of gas for 10-20 years. These large gas flow rates allow the high capital cost of the cryogenic plant to be defrayed over a number of years. Many small gas wells are shut in for lack of suitable small-scale nitrogen separation technology.

Removal of $N_2$ from landfill gas after bulk removal of water, VOCs and $CO_2$ (along with some $O_2$ if a membrane route is used) is well known with two commercial routes based on PSA technology. In the first route, a Molecular Gate™ process is applied wherein a size selective adsorbent adsorbs the $N_2$, while the larger methane molecule does not fit in the adsorbent pore and passes through the bed of adsorbent at high pressure. When the bed is saturated, the adsorbed $N_2$ is removed by pulling vacuum on the adsorbent bed. The process is attractive in that it retains the methane at high pressure, but suffers from high cost and relatively low methane recovery (less than 90 vol %).

In a second route, an alternate PSA process has been applied, wherein the methane is adsorbed on a bed of adsorbent, typically activated carbon, while $N_2$ passes through the bed at high pressure. To produce high purity methane, a rinse/recycle step is commonly applied, and the methane is desorbed under vacuum. The process can achieve high methane recovery, but has a high cost and power requirement. An illustrative example is U.S. Pat. No. 8,211,211 to Knaebel, which utilizes a PSA system to remove $N_2$.

Membrane processes have been applied to remove $N_2$ from natural gas, and either membranes that permeate $N_2$ at a higher rate than methane (leaving methane at high pressure as the non-permeate stream), or that permeate methane (to lower pressure than the feed) have been considered. The membrane route offers cost savings compared to PSA routes from natural gas, but suffers from a relatively low selectivity for $CH_4$ over $N_2$ of 3 or lower. As a result, multiple membrane stages are required to obtain at least 94 vol % methane from natural gas. This low selectivity problem also exists for many $N_2$ permeating membranes. Some illustrative examples include U.S. 2007/0125537 to Lokhandwala, et al., "Membrane separation of nitrogen from natural gas: A case study from membrane synthesis to commercial deployment" by Lokhandwala, et al. in *Journal of Membrane Science* 346 (2010) 270-279, and "Silicone-coated polymeric membrane for separation of hydrocarbons and nitrogen at sub-ambient temperatures" by Jiang, et al. in *Journal of Membrane Science* 286 (2006) 285-292.

Therefore, there is a need for a membrane system that rejects $N_2$ from biomethane, such that the pipeline quality gas containing greater than 94 vol % methane is produced at a lower cost or higher recovery than current technology.

SUMMARY OF THE INVENTION

There is disclosed a method for purifying biogas that comprises the following steps. A biogas feed stream is pretreated so as to remove amounts of water, VOCs and $CO_2$ from the biogas feed stream to produce a methane-enriched biogas stream that comprises methane, $N_2$, $CO_2$ and $O_2$, where $N_2$ is present in the methane-enriched biogas stream at a concentration of at least 5 vol %. A biomethane feed stream is separated at a first separation stage into a first permeate gas stream comprising at least 90 vol % $CH_4$ and less than 8 vol % $N_2$ and a first retentate gas stream comprising at least 10 vol % $N_2$, where first separation stage comprises at least one polymeric gas separation membrane selective for methane over $N_2$. The first permeate gas stream is separated at a second separation stage comprising at least one polymeric gas separation membrane into a second permeate gas stream comprising at least 94 vol % $CH_4$ and less than 5 vol % $N_2$ and a second retentate gas stream comprising at least 7 vol % $N_2$, where second separation stage comprises at least one polymeric gas separation membrane selective for methane over $N_2$. The first retentate gas stream is separated at a third separation stage comprising at least one polymeric gas separation membrane into a third permeate gas stream comprising at least 80 vol % $CH_4$ and less than 20 vol % $N_2$ and a third retentate gas stream comprising at least 40 vol % $N_2$, where third separation stage comprising at least one polymeric gas separation membrane selective for methane over $N_2$. The methane-enriched biogas stream, second retentate gas stream and third permeate gas stream are fed to a compression station comprising one or more compressors where they are combined and compressed to form the biomethane feed stream. The second permeate gas stream is withdrawn as biomethane product gas.

There is disclosed a method for purifying biogas that comprises the following steps. A biogas feed stream is pretreated so as to remove amounts of water, VOCs and $CO_2$ from the biogas feed stream to produce a methane-enriched biogas stream that comprises methane, $N_2$, $CO_2$ and $O_2$, where $N_2$ is present in the methane-enriched biogas stream at a concentration of at least 5 vol %. A biomethane feed stream is separated at a first separation stage into a first permeate gas stream comprising at least 90 vol % $CH_4$ and less than 8 vol % $N_2$ and a first retentate gas stream comprising at least 10 vol % $N_2$, where first separation stage comprises at least one polymeric gas separation membrane selective for methane over $N_2$. The first permeate gas stream is separated at a second separation stage comprising at least one polymeric gas separation membrane into a second permeate gas stream comprising at least 94 vol % $CH_4$ and less than 5 vol % $N_2$ and a second retentate gas stream comprising at least 7 vol % $N_2$, where second separation stage comprises at least one polymeric gas separation membrane selective for methane over $N_2$. The first retentate gas stream is separated at a third separation stage comprising at least one polymeric gas separation membrane into a third permeate gas stream comprising at least 80 vol % $CH_4$ and less than 20 vol % $N_2$ and a third retentate gas stream comprising at least 40 vol % $N_2$, where third separation stage comprising at least one polymeric gas separation membrane selective for methane over $N_2$. The second stage permeate gas stream is compressed. The compressed second stage permeate gas stream is separated at a fourth separation stage comprising at least one glassy gas separation membrane, each having a $N_2$/methane selectivity of at least 1.5, into a fourth permeate gas stream and fourth retentate gas stream. The methane-enriched biogas stream, second retentate gas stream, third permeate gas stream, and fourth permeate gas stream are fed to a compression station comprising one or more compressors where they are combined and compressed to form the biomethane feed stream. The fourth retentate gas stream is withdrawn as biomethane product gas.

There is also disclosed a system for purifying biogas, comprising: a pretreatment unit comprising an inlet for receiving a biogas feed stream, an outlet, and one more gas purification apparatuses adapted and configured to remove amounts of VOCs, $CO_2$, and water from the biogas feed stream and produce a stream of methane-enriched biogas being deficient in VOCs, $CO_2$, and water compared to said biogas feed stream; a compression station including an inlet, one or more compressors, and an outlet, the inlet of the compression station being in fluid communication with said treatment unit outlet, said main compressor being adapted and configured to compress the methane-enriched biogas stream; a first separation stage comprising an inlet, a permeate outlet, a retentate outlet, and one or more gas separation membranes having a methane/$N_2$ selectivity of at least 1.5, the inlet of the first separation stage being in fluid communication with the main compressor outlet and receiving a compressed biomethane feed stream therefrom, the first separation stage being adapted and configured to separate the compressed biomethane feed stream into a first permeate gas stream and a first retentate gas stream; a second separation stage comprising an inlet, a permeate outlet, a retentate outlet, and one or more gas separation membranes having a methane/$N_2$ selectivity of at least 1.5, the inlet of the second separation stage being in fluid communication with the permeate outlet of the first separation stage and receiving the first permeate gas stream therefrom, the second separation stage being adapted and configured to separate the first permeate gas stream into a biomethane product gas and a first low quality biomethane gas stream; and a third separation stage comprising an inlet, a permeate outlet, a retentate outlet, and one or more gas separation membranes having a methane/$N_2$ selectivity of at least 1.5, the inlet of the third separation stage being in fluid communication with the retentate outlet of the first separation stage and receiving the first retentate gas stream therefrom, the third separation stage being adapted and configured to separate the first retentate gas stream into a second low quality biomethane gas stream and a waste gas, wherein the compression station is adapted and configured to comingle and compress the first and second low quality biomethane gas streams with the methane-enriched biogas stream, thereby providing the compressed biomethane feed stream that is fed to the inlet of the first separation stage.

There is disclosed another system for purifying biogas, comprising: a pretreatment unit comprising an inlet for receiving a biogas feed stream, an outlet, and one more gas purification apparatuses adapted and configured to remove amounts of VOCs, $CO_2$, and water from the biogas feed stream and produce a stream of methane-enriched biogas being deficient in VOCs, $CO_2$, and water compared to said biogas feed stream; a compression station including an inlet, one or more compressors, and an outlet, the inlet of the compression station being in fluid communication with said treatment unit outlet, said compression station being adapted and configured to compress the methane-enriched biogas stream; a first separation stage comprising an inlet, a permeate outlet, a retentate outlet, and one or more gas separation membranes having a methane/$N_2$ selectivity of at least 1.5, the inlet of the first separation stage being in fluid communication with the main compressor outlet and receiving a compressed biomethane feed stream therefrom, the first separation stage being adapted and configured to separate the compressed biomethane feed stream into a first permeate gas stream and a first retentate gas stream; a second separation stage comprising an inlet, a permeate outlet, a retentate outlet, and one or more gas separation membranes having a methane/$N_2$ selectivity or a $N_2$/methane selectivity of at least 1.5, the inlet of the second separation stage being in fluid communication with the permeate outlet of the first separation stage and receiving the first permeate gas stream therefrom, the second separation stage being adapted and configured to separate the first permeate gas stream into a second permeate gas stream and a second retentate gas stream, wherein:

the compression station inlet is in fluid communication with the retentate outlet of the second separation stage in which case the one or more gas separation membranes of the second stage have a methane/$N_2$ selectivity of at least 1.5, the second permeate gas stream is biomethane product gas and the second retentate gas stream is a first low quality biomethane gas stream, or the compression station inlet is in fluid communication with the permeate outlet of the second separation stage in which case the one or more gas separation membranes of the second stage have a $N_2$/methane selectivity of at least 1.5, the second permeate gas stream is a first low quality biomethane gas stream and the second retentate gas stream is biomethane product gas;

a third separation stage comprising an inlet, a permeate outlet, a retentate outlet, and one or more gas separation membranes having a methane/$N_2$ selectivity or a $N_2$/methane selectivity of at least 1.5, the inlet of the third separation stage being in fluid communication with the retentate outlet of the first separation stage and receiving the first retentate gas stream therefrom, the third separation stage being adapted and configured to separate the first retentate gas stream into a third permeate gas stream and third retentate gas stream, wherein:

the compression station inlet is in fluid communication with the permeate outlet of the third separation stage in which case the one or more gas separation membranes of the third stage have a $N_2$/methane selectivity of at least 1.5, the third permeate gas stream is a second low quality biomethane gas stream, and the third retentate gas stream is waste gas, or the compression station inlet is in fluid communication with the retentate outlet of the third separation stage in which case the one or more gas separation membranes of the third separation stage have a $N_2$/methane selectivity of at least 1.5, the third retentate gas stream is a second low quality biomethane gas stream, and the third permeate gas stream is waste gas;

wherein the main compressor is adapted and configured to comingle and compress the first and second low quality biomethane gas streams with the compressed methane-enriched biogas stream, thereby providing the compressed biomethane feed stream that is fed to the inlet of the first separation stage.

There is also disclosed a system for purifying biogas, comprising: a pretreatment unit comprising an inlet for receiving a biogas feed stream, an outlet, and one or more gas purification apparatuses adapted and configured to remove amounts of VOCs, $CO_2$, and water from the biogas feed stream and produce a stream of methane-enriched biogas being deficient in VOCs, $CO_2$, and water compared to said biogas feed stream; a compression station including an inlet, one or more compressors, and an outlet, the inlet of the main compressor being in fluid communication with said treatment unit outlet, said main compressor being adapted and configured to compress the methane-enriched biogas stream; a first separation stage comprising an inlet, a permeate outlet, a retentate outlet, and one or more gas separation membranes having a methane/$N_2$ selectivity of at least 1.5, the inlet of the first separation stage being in fluid communication with the main compressor outlet and receiving a compressed biomethane feed stream therefrom, the first separation stage being adapted and configured to separate the compressed biomethane feed stream into a first permeate gas stream and a first retentate gas stream; a second separation stage comprising an inlet, a permeate outlet, a retentate outlet, and one or more gas separation membranes having a methane/$N_2$ selectivity of at least 1.5, the inlet of the second separation stage being in fluid communication with the permeate outlet of the first separation stage and receiving the first permeate gas stream therefrom, the second separation stage being adapted and configured to separate the first permeate gas stream into a second permeate gas stream and a first low quality biomethane gas stream; a third separation stage comprising an inlet, a permeate outlet, a retentate outlet, and one or more gas separation membranes having a methane/$N_2$ selectivity of at least 1.5, the inlet of the third separation stage being in fluid communication with the retentate outlet of the first separation stage and receiving the first retentate gas stream therefrom, the third separation stage being adapted and configured to separate the first retentate gas stream into a second low quality biomethane gas stream and a waste gas; and a fourth separation stage comprising an inlet, a permeate outlet, a retentate outlet, and one or more gas separation membranes having a $N_2$/methane selectivity of at least 1.5, the inlet of the third separation stage being in fluid communication with the permeate outlet of the second separation stage and receiving the second permeate gas stream therefrom, the fourth separation stage being adapted and configured to separate the second permeate gas stream into a third low quality biomethane gas stream and a biomethane product gas, wherein the compression station is adapted and configured to comingle and compress the first, second, and third low quality biomethane gas streams with the methane-enriched biogas stream, thereby providing the compressed biomethane feed stream that is fed to the inlet of the first separation stage.

Any or more of the method and systems may include one or more of the following aspects:
- pretreating a biogas feed stream so as to remove amounts of water, VOCs and $CO_2$ from the biogas feed stream to produce the methane-enriched biogas stream.
- the biomethane product gas is compressed in a secondary compressor.
- the methane-enriched biogas stream comprises at least 85 vol % methane and impurities comprising at least 5 vol % and up to 15 vol % $N_2$, a non-zero amount of $O_2$ up to 1 vol % $O_2$; a non-zero amount of $CO_2$ but less than 2 vol %; no more than 0.05 wt. % water, and less than 100 ppm each of $H_2S$ and VOCs.
- at least one of said at least one membrane of said first, second and third separation stages is comprised of a porous polymeric substrate having at least one separation layer, wherein said substrate is selected from the group consisting of polyimides, poly sulfones, polyether ether ketones, and mixtures thereof.
- the substrate is a polyether ether ketone.
- the at least one separation layer is made of a copolymer or block polymer of the formula:

where PA is an aliphatic polyamide having 6 or 12 carbon atoms and PE is either poly(ethylene oxide) or poly (tetramethylene oxide).
- the separation layer is a polymer made of repeating units of the following monomers:

- the separation layer is a copolymer or block polymer made up of monomeric units of dimethylsiloxane, methylhexylsiloxane, methylphenylsiloxane, methyloctylsiloxane, or combinations thereof.
- the separation layer is a polymer made up of monomeric units of tetramethylene oxide, propylene oxide, ethylene oxide, or combinations thereof.
- the at least one membrane of said third separation stage is made up of cellulose acetate, a polysulfone, or a polyimide.
- each of said at least one membrane of said first, second and third separation stages has a $CH_4/N_2$ selectivity of 1.5 to 5.5.
- a pressure differential between said biomethane feed stream and said first permeate gas stream is at least 100 psig.
- the pressure differential is at least 150 psig.
- the first permeate gas stream comprises at least 92 vol % methane, less than 1 vol % carbon dioxide, less than 7 vol % nitrogen, and less than 0.05 wt. % water.
- the first retentate gas comprises at least 80 vol % methane, less than 20 vol % nitrogen, less than 0.5 vol % $CO_2$, and less than 0.05 wt. % water.
- the third retentate gas stream is flared.
- the step of pretreating includes removal of an amount of particles from the biogas feed stream using a filter.
- the third retentate stream is oxidized in a thermal oxidizer.
- the biomethane product gas includes $N_2$ at a concentration of no more than 3 vol %, $CO_2$ at a concentration of less than 2 vol %, and $H_2O$ at a concentration of less than 0.01 wt. %.

at least one membrane of the first, second or third separation stage has a separation layer made of polymers of siloxanes, such as polydimethylsiloxane, polymethylhexylsiloxane, polymethyloctylsiloxane, polymethylphenyl siloxane, or copolymers with polyimide, polycarbonate, polyamide, etc.

at least one membrane of said first separation stage is in the form of spiral wound sheets, flat films, or hollow fibers.

the one or more gas purification apparatuses comprise: a fourth separation stage comprising an inlet, a permeate outlet, a retentate outlet, and one or more gas separation membranes having a $CO_2$/methane selectivity of at least 10; and a fifth separation stage comprising an inlet, a permeate outlet, a retentate outlet, and one or more gas separation membranes having a $CO_2$/methane selectivity of at least 10, the inlet of the main compressor being in fluid communication with the retentate outlet of the fifth separation stage.

DETAILED DESCRIPTION OF THE INVENTION

Nitrogen is removed from a methane-enriched biogas using a gas separation membrane based purification scheme to yield biomethane that meets pipeline or fuel specifications for nitrogen content.

The biogas feed stream to be pretreated is obtained from a landfill. Such biogas is a mixture of different gases produced from the breakdown of organic matter in a landfill in an anaerobic digestion process that includes both methane and $CO_2$ at relatively high concentrations and lesser levels of VOCs and water. The biogas feed stream typically comprises 50-70 vol % methane and 20-50 vol % $CO_2$. It also includes lower levels of other components such as $N_2$ and $O_2$ (typically from air infiltration), up to 5,000 ppm (or even more) of $H_2S$, sometimes measurable amounts of siloxanes, up to 1,000-2,000 ppm of VOCs. It is also typically saturated with water. As used herein, VOCs mean volatile organic compounds having a boiling point at atmospheric pressure of 50-250° C. The composition of the biogas feed stream may vary depending upon the substrate composition in the landfill, as well as the conditions within the landfill, such as temperature and pH.

The biogas feed stream is treated by a pretreatment unit that includes one or more gas purification apparatuses. Since the biogas feed stream is ordinarily pressurized a little above atmospheric, in order to provide a driving force for the gas purification apparatus(es), it is typically compressed to a pressure of about 150-200 psig. Optional apparatuses include, but are not limited to, a coalescing filter for removing water, oil, or organic condensate, a pressure swing adsorption unit for removing VOCs and $H_2S$, a non-regenerable adsorption unit for further removal of $H_2S$, and gas separation membranes for removing $CO_2$ (and optionally VOCs). The resultant methane-enriched biogas stream contains at least 5 vol % $N_2$. Without measures to remove some of the $N_2$, such $N_2$ levels in the resultant methane-enriched biogas stream (obtained from the pretreatment unit) may render it unsuitable for many purposes, such as some pipelines or gensets (using it as a fuel) having stringent $N_2$ specifications.

The methane-enriched biogas stream withdrawn from the pretreatment unit is fed to a compression station including one or more compressors where it is pressurized along with other methane-containing gas feeds (described below) to yield a biomethane feed stream. The compression station may include a single stage compressor, a multi-stage compressor with optional intercooling between stages or two or more individual compressors in series with cooling in between compressors. The thus-compressed biomethane stream may be optionally passed through a coalescing filter to remove amounts of any oil that may have leaked from the main compressor. Depending upon the operating temperature of the first separation stage, the compressed biomethane stream may optionally be cooled prior to be fed to the first separation stage. Either upstream of the compression station or immediately downstream of the compression station, optionally, a filter may be used for removal of solid particles from the biomethane or compressed biomethane stream so as to avoid sending particulates to the separation stages.

The first separation stage includes one or more polymeric gas separation membranes that are selective for methane over $N_2$ and that typically have a methane/$N_2$ selectivity of at least 1.5, more often a methane/$N_2$ selectivity of 1.5-5.5, and more typically a methane/$N_2$ selectivity of 3.0-4.0. Two terms, "permeability" and "selectivity", are used to describe the most important properties of membranes-productivity and separation efficiency respectively. Permeability (P) equals the pressure and thickness normalized flux, as shown in the following equation:

$$P_i = \frac{n_i \cdot l}{\Delta p_i} \quad (1)$$

where $n_i$ is the penetrant flux through the membrane of thickness (l) under a partial pressure ($\Delta p_i$). The most frequently used unit for permeability, Barrer, is defined as below:

$$\text{Barrer} = 10^{-10} \frac{cc(STP) \cdot cm}{cm^2 \cdot s \cdot cmHg} \quad (2)$$

Selectivity is a measure of the ability of one gas to flow through the membrane over that of another gas. When the downstream pressure is negligible, the ideal selectivity (based upon the permeabilities of pure gases) of the membrane, can be used to approximate the real selectivity (based upon the permeabilities of the gases in a gas mixture). In this case, the selectivity ($\alpha_{A/B}$) is the permeability of a first gas A divided by the permeability of a second gas B.

Each gas in a gas mixture fed to a membrane permeates across the membrane from the higher pressure side to the lower pressure side at a different rate, dependent in part upon the solubility of the gas in the polymeric material of the membrane. Generally speaking, for any pair of gases to be separated by a gas separation membrane, the gas having the higher permeability may be referred to as the fast gas while the gas having the lower permeability may be referred to as the slow gas. Also, the mixture of gases that permeates across the membrane is referred to as the permeate gas while the mixture of gases that does not permeate across the membrane is referred to as the retentate gas. Unless a sweep gas is used, the permeate gas will naturally have a higher concentration of the fast gas than the feed gas and retentate gas, and conversely, a lower concentration of the slow gas than the feed gas the retentate gas. In this manner, the fast gas becomes enriched in the permeate gas and deficient in the retentate gas. Thus, for the gas pair of methane and $N_2$, methane is the fast gas, $N_2$ is the slow gas, and methane permeates across the membrane at a higher rate than does $N_2$.

The membranes may be configured as spiral wound sheets or as hollow fibers. The membranes may be monolithic or composite in structure. Monolithic membranes are comprised of a single material and include an ultra-thin, dense selective layer on one side. Composite membranes, on the other hand, comprise a selective layer disposed over a substrate. While the polymeric material that forms the substrate is not limited, it is typically selected from the group consisting of polyimides, polysulfones, and polyether ether ketones. More typically, it is made of polyether ether ketones ("PEEK"). The selective layer, whether in monolithic or composite form, is wholly or primarily responsible for performing the separation of the gases while the remainder of the membrane provides a mechanical support for the selective layer and may play a lesser role in separation of the gases. In the context of composite hollow fibers, the separation layer is configured as a sheath surrounding a core (i.e., the substrate). In the case of hollow fibers, the fiber typically has an outside diameter from about 50 to about 50,000 micrometers, more typically from about 80 to about 1,000 micrometers, and a wall thickness from about 10 to about 1,000 micrometers, typically from 20 to 500 micrometers. In the case of spiral wound film, the film typically has a thickness of from about 10 to about 1,000 micrometers, most typically from about 25 to about 500 micrometers. Each film may be optionally supported by a permeable cloth or a screen.

The separation layer is made of a polymer, copolymer, block copolymer, or blends or mixtures thereof whose intrinsic properties yield a membrane possessing the requisite selectivity and non-limiting examples include polysiloxanes, polyethers, cellulose acetate, polysulfones, and polyimides.

The separation layer may be made of a polysiloxane, such as polydimethylsiloxane, polymethylhexylsiloxane, polymethyloctylsiloxane, polymethylphenyl siloxane, or copolymers such as polysiloxane imides, polysiloxane carbonates, polysiloxane amides, polysiloxane ethers, etc.

Alternatively, the separation layer may be made of a copolymer or block polymer of the formula:

where PA is an aliphatic polyamide having 6 or 12 carbon atoms and PE is either poly(ethylene oxide) poly(tetramethylene oxide). These copolymers are commercially available as poly(ether-b-amide) multiblock copolymers from Arkema under the trade name of PEBAX®, and poly(butylene terephthalate) ethylene oxide copolymer available under the trade name of Polyactive®. Typically, the PEBAX polymers from Arkema include PEBAX 7233, PEBAX 7033, PEBAX 6333, PEBAX 2533, PEBAX 3533, PEBAX 1205, PEBAX 3000, PEBAX 1657, or PEBAX 1074.

Alternatively, the separation layer may be made of repeating units of the following monomers, also known as Polyactive® multiblock copolymers:

Alternatively, the separation layer may be made of a copolymer or block polymer of tetramethylene oxide, and/or propylene oxide, or ethylene oxide. These copolymers or block polymers of tetramethylene oxide, and/or propylene oxide, or ethylene oxide may be conveniently synthesized, such as the polyester ether disclosed in U.S. Pat. No. 6,860,920, the polyester ethers of which are incorporated by reference;

wherein PE may be one or more of the following structures:

Other copolymers or block polymers of tetramethylene oxide, and/or propylene oxide, or ethylene oxide may be conveniently synthesized, such as polyimide ether disclosed in U.S. Pat. No. 5,776,990, the polyimide ethers of which are incorporated by reference. The copolymers can be further obtained by copolymerization of acrylated monomers containing oligomeric propylene oxide, ethylene oxide, or tetramethyelene oxide.

Alternatively, the separation layer may be made of a Polyimides essentially consists of repeating units of dianhydride-derived units of formula (I) and diamine-derived units (I)

Each R is a molecular segment independently selected from the group consisting of formula (1), formula (2), formula (3), and formula (4):

(1)
(2)
(3)
(4)

Each Z is a molecular segment independently selected from the group consisting of formula (5), formula (6), formula (7), formula (8), and formula (9).

(5)
(6)
(7)
(8)
(9)

Each diamine-derived unit is a diamine-derived moiety independently selected from the group consisting of formula (A), formula (B), formula (C), formula (D), formula (E), formula (F), formula (G), and formula (H):

(A)

(B)

(C)

(D)

(E)

(F)

(G)

(H)

Each X, $X_1$, $X_2$, $X_3$, $X_4$, $X_5$, $X_6$, $X_7$, and $X_8$ is independently selected from the group consisting of hydrogen, an aromatic group, and a straight or branched $C_1$ to $C_6$ alkyl group. Each $R_a$ is a straight or branched $C_1$ to $C_6$ alkyl group having either a terminal hydroxyl group, a terminal carboxylic acid group, or a terminal carbon to carbon double bond. Each Z' is a molecular segment selected from the group consisting of formula (a), formula (b), formula (c), and formula (d):

(a)

-continued

Each Z" is a moiety selected from the group consisting of formula (U) and formula (V):

Each $X_9$ is selected from the group consisting of hydrogen, a straight or branched alkyl group having 1 to 6 carbon atoms, and a straight or branched perfluoroalkyl group having 1 to 6 carbon atoms.

So-called rubbery membranes exhibit superior resistance to VOC's such as benzene, toluene, and xylene (BTX), and also to water, mercaptans, and acid gases.

Suitable gas separation membranes are commercially available from Air Liquide Advanced Separations, a unit of Air Liquide Advanced Technologies, US.

Through the gas separation membrane(s), the first separation stage separates the compressed biomethane stream into a first permeate gas stream and a first retentate gas stream. Because of the methane/$N_2$ selectivity of the membrane(s), the methane in the compressed biomethane stream preferentially permeates across the membrane in comparison to $N_2$. Thus, the separation yields a methane-enriched permeate gas stream and a $N_2$-enriched retentate gas stream in comparison to the compressed biomethane stream. The permeate gas stream typically contains at least 90 vol % methane and less than 8 vol % $N_2$ and is often at a pressure of about one third of the feed pressure (for example, at 150 psi when the feed pressure is 450 psi) often yielding a pressure drop across the retentate, high pressure side, of the membrane of less than 50 psi (3.45 bar), typically less than 30 psi (2.07 bar), and even more typically, less than 20 psi (1.38 bar). The retentate gas stream remains at a pressure close to that of the compressed biomethane stream, minus any pressure drop from the feed side to the retentate outlet of the first separation stage.

The permeate gas stream from the first separation stage is fed to a second separation stage which includes one or more gas separation membranes that are selective for methane over $N_2$ and that typically have a methane/$N_2$ selectivity of at least 1.5, more often a methane/$N_2$ selectivity of 1.5-5.5, and more typically a methane/$N_2$ selectivity of 3.0-4.0. The gas separation membrane(s) of the second separation stage may be the same as or different from that of the first separation stage. Similar to the first separation stage, because of the methane/$N_2$ selectivity of the membrane(s) in the second separation stage, the methane in the permeate gas stream from the first separation stage preferentially permeates across the membrane in comparison to $N_2$. Thus, the separation yields a methane-enriched permeate gas stream and a $N_2$-enriched retentate gas stream in comparison to the permeate gas stream from the first separation stage.

The second stage permeate gas stream constitutes a biomethane product gas whose composition is suitable for injection into a natural gas pipeline, for use as a fuel in engines such as gensets (integrated internal combustion engine and electrical generator) or natural gas vehicles, or for production of liquid natural gas (LNG) through liquefaction (including optional further purification) of the biomethane product gas. Biomethane qualifies as an advanced biofuel under the Renewable Fuel Standards. Typically, biomethane meets the requirements of SoCal Gas® Rule 30 and/or PG&E Rule 21, meets predetermined delivery pipeline or compressed natural gas (CNG) station requirements, and has at least 90 vol %, typically at least 94 vol %, more typically at least 96 vol %, of methane, less than 5 vol %, typically less than 3 vol %, of $N_2$, less than 3 vol % of $CO_2$, and less than 100 ppm of $H_2S$ and VOC's. SoCalGas® Rule 30 sets forth the standards for utility methane gas injection in large portion of California. Specifically, according to Rule 30, the methane gas to be delivered should have the following characteristics.

Heating Value: The minimum heating value of nine hundred and ninety (990) Btu (gross) per standard cubic foot on a dry basis, a maximum heating value of one thousand one hundred fifty (1150) Btu (gross) per standard cubic foot on a dry basis.

Moisture Content or Water Content: For gas delivered at or below a pressure of eight hundred (800) psig, the gas shall have a water content not in excess of seven (7) pounds per million standard cubic feet. For gas delivered at a pressure exceeding of eight hundred (800) psig, the gas shall have a water dew point not exceeding 20° F. at delivery pressure.

Hydrogen Sulfide: The gas shall not contain more than twenty-five hundredths (0.25) of one (1) grain of hydrogen sulfide, measured as hydrogen sulfide, per one hundred (100) standard cubic feet (4 ppm). The gas shall not contain any entrained hydrogen sulfide treatment chemical (solvent) or its by-products in the gas stream.

Mercaptan Sulfur: The gas shall not contain more than three tenths (0.3) grains of mercaptan sulfur, measured as sulfur, per hundred standard cubic feet (5 ppm).

Total Sulfur: The gas shall not contain more than seventy-five hundredths (0.75) of a grain of total sulfur compounds, measured as a sulfur, per one hundred (100) standard cubic feet (12.6 ppm). This includes COS and $CS_2$, hydrogen sulfide, mercaptans and mono, di and poly sulfides.

Carbon Dioxide: The gas shall not have a total carbon dioxide content in excess of three percent (3%) by volume.

Oxygen: The gas shall not have an oxygen content in excess of two-tenths of one percent (0.2%) by volume, and customer will make every reasonable effort to keep the gas free of oxygen.

Inerts: The gas shall not contain in excess of four percent (4%) total inerts (the total combined carbon dioxide, nitrogen, oxygen and any other inert compound) by volume.
Hydrocarbons: For gas delivered at a pressure of 800 psig or less, the gas hydrocarbon dew point is not to exceed 45° F. at 400 psig, or at the delivery pressure, if the delivery pressure is below 400 psig. For gas delivered at a pressure higher than 800 psig, the gas hydrocarbon dew point is not to exceed 20° F., measured at a pressure of 400 psig.

If the intermediate or ultimate use of the biomethane product gas requires pressures higher than those typically exhibited by the second separation stage permeate (for example, 15 psig), the biomethane product gas may be pressurized in by a secondary compressor to a much higher pressure (for example 800 psig). It may subsequently be injected into a natural gas pipeline, fed to an onsite storage tank for filling CNG vehicles or devices containing natural gas-fired internal combustion engines (such as gensets), fed to a storage tank for transport offsite, liquefied to produce LNG, or in some cases, fed to a purification unit for further processing.

The first separation stage retentate gas stream remains at a pressure close to that of the compressed biomethane stream, minus any pressure drop from the feed side to the retentate outlet of the first separation stage. Because it still contains valuable amounts of methane, this retentate gas stream is fed to a third separation stage which includes one or more gas separation membranes that are selective for methane over $N_2$ and that typically have a methane/$N_2$ selectivity of at least 1.5, more often a methane/$N_2$ selectivity of 1.5-5.5, and more typically a methane/$N_2$ selectivity of 3.0-4.0. The gas separation membrane(s) of the third separation stage may be the same as or different from that of the first separation stage. The membrane(s) of the third separation stage yield a methane-enriched permeate gas stream and a N2-enriched retentate stream in comparison to the first stage retentate gas stream. The retentate gas stream yielded by the third separation stage, which is a waste gas, has too little methane to be useful in recycling so it is either vented, used as local low quality fuel, flared, or oxidized in a thermal oxidizer. Typically, this retentate contains at least 40% $N_2$.

Because the second stage retentate gas stream and the third stage permeate gas stream contain useful amounts of methane, they are recycled to the inlet of the compression station for comingling and compression with the methane-enriched biogas stream. For example, the third stage permeate gas stream ordinarily contains at least 80 vol % $CH_4$ and less than 20 vol % $N_2$.

It should be noted that the invention excludes the use of regenerable adsorption systems, such as PSA, TSA, and VSA, downstream of the pretreatment unit. Thus, no regenerable adsorbent beds are used for the purpose of reducing a $N_2$ content of the methane-enriched biogas stream. This exclusion of regenerable adsorbent beds reduces the cost, as well as eliminates the need for clean, low pressure gas and pre-conditioning facilities.

In an alternative embodiment, instead of withdrawing the second permeate gas stream as biomethane product gas, it may instead be compressed and fed to a fourth separation stage, that includes one or more glassy membranes that are selective for N2 over methane (for example, having a N2/methane selectivity of at least 1.5). The fourth separation stage of this alternative scheme separates the compressed second permeate gas stream into a N2-enriched fourth permeate gas stream and a methane-enriched fourth retentate gas stream that constitutes the biomethane product gas. In this alternative scheme, the fourth permeate gas stream contains valuable amounts of methane. In order to boost the overall methane recovery, the fourth permeate gas stream is compressed if needed (such as by one or more compressors of the compression station or by a stand-alone compressor), combined (either upstream, at, or downstream of the compression station) with the second retentate gas stream and the third permeate gas stream, and subsequently fed back to the first separation stage.

Now, two illustrative systems will be described.

Figure 1:
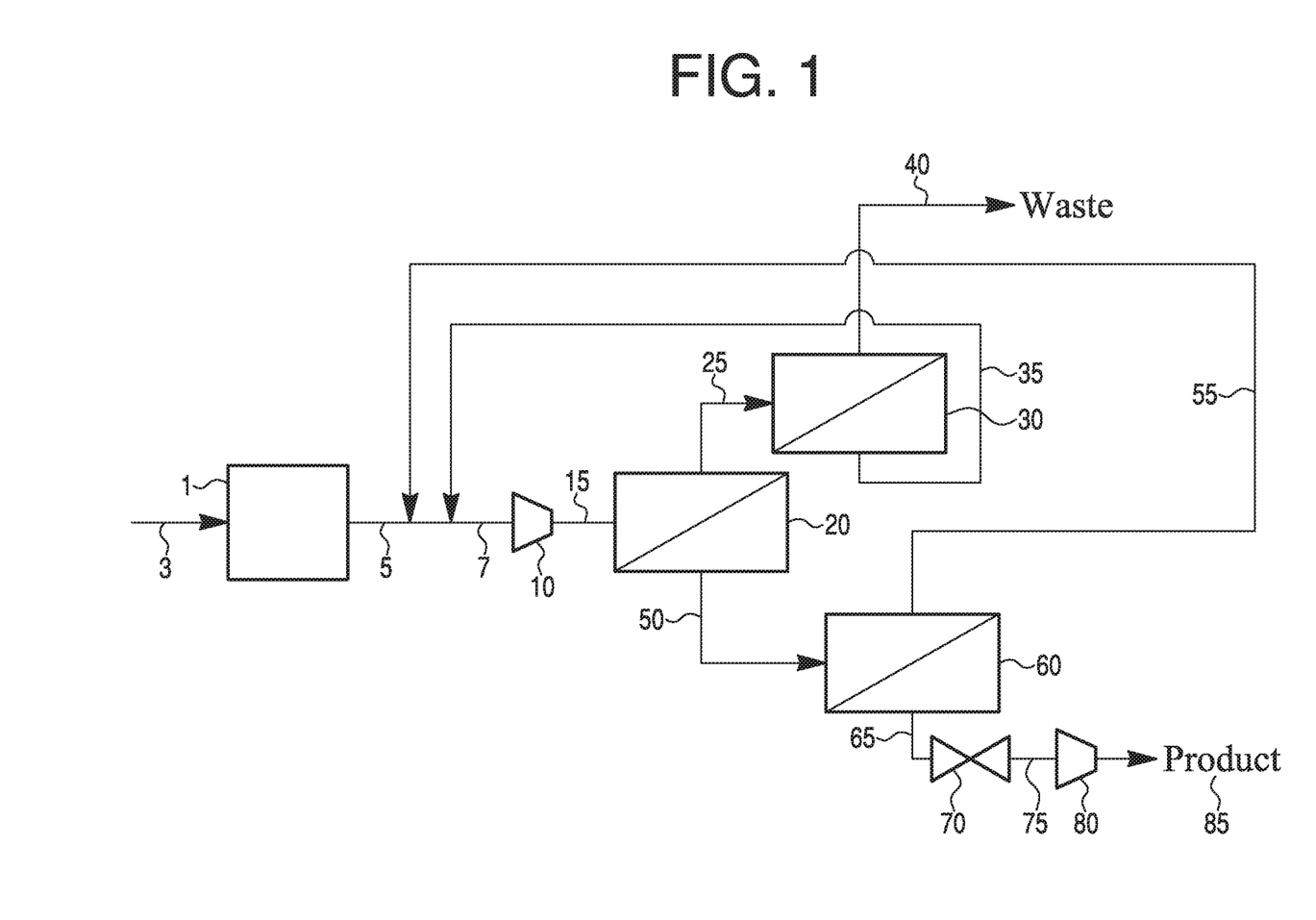
FIG. 1 is a schematic of one embodiment of removal of nitrogen from biomethane by a three-stage membrane system.

As best illustrated in FIG. 1, a biogas feed stream 3 is fed to a pretreatment unit 1 including an inlet, one or more gas purifications apparatuses, and an outlet where amounts of water, VOCs, and $CO_2$ are removed from the biogas feed stream 3 to yield a methane-enriched biogas stream 5. The biogas stream 5 is combined with a second retentate gas stream 55 and a third permeate gas stream 35 and compressed at a compression station 10 to form a biomethane feed stream 15.

The biomethane feed stream 15, which is at a higher pressure than that of the methane-enriched biogas stream 5, second retentate gas stream 55 and third permeate gas stream 35, is fed to a first separation stage 20 including an inlet, one or more gas separation membranes (having a methane/$N_2$ selectivity of at least 1.5), and an outlet. The biomethane feed stream 15 is separated by the first separation stage 20 (via the one or more gas separation membranes) into a first permeate gas stream 50 and a first retentate gas stream 25.

The first permeate gas stream 50 is fed to a second separation stage 60 that includes an inlet, one or more gas separation membranes (having a methane/$N_2$ selectivity of at least 1.5), and an outlet. The first permeate gas stream 50 is separated by the second separation stage 60 into a second permeate gas stream 65 and a second retentate gas stream 55. The backpressure of the second permeate gas stream 65 (which constitutes biomethane product gas) is controlled with pressure control valve 70. Because the flow rate and/or composition of the second permeate gas stream 65 may vary substantially over time in response to changes in the biogas feed stream 3 and the methane-enriched biogas stream 5, the pressure control valve 70 may be opened by a variable amount by a programmable logic controller (not illustrated) in response to a drop in flow rate or change in the nitrogen concentration of the second permeate gas stream 65 (measured by non-illustrated sensors). The pressure-regulated second permeate gas stream 75 is compressed by a secondary compressor 80 to provide the final biomethane product gas 85. The final biomethane product gas 85 contains less than 5% $N_2$ (more typically 4 vol % or less) and at least 94 vol % methane (more typically at least 96 vol %. The second retentate gas stream 55 constitutes a first low quality biomethane gas stream.

The first retentate gas stream 25 is fed to a third separation stage 30 which includes in inlet, one or more gas separation membranes (having a methane/$N_2$ selectivity of at least 1.5), and an outlet. The first retentate gas stream 25 is separated by the third separation stage 30 into a third permeate gas stream 35 and a third retentate gas stream 40. The third permeate gas stream 35 constitutes a second low quality biomethane gas stream. The third retentate gas stream 40 constitutes a waste gas.

Because they contain useful amounts of methane, the second stage permeate and third stage retentate gas streams 55, 35 are recycled to an inlet of the compression station 1 where they are comingled and compressed with the methane-enriched biogas stream 5.

Figure 2:
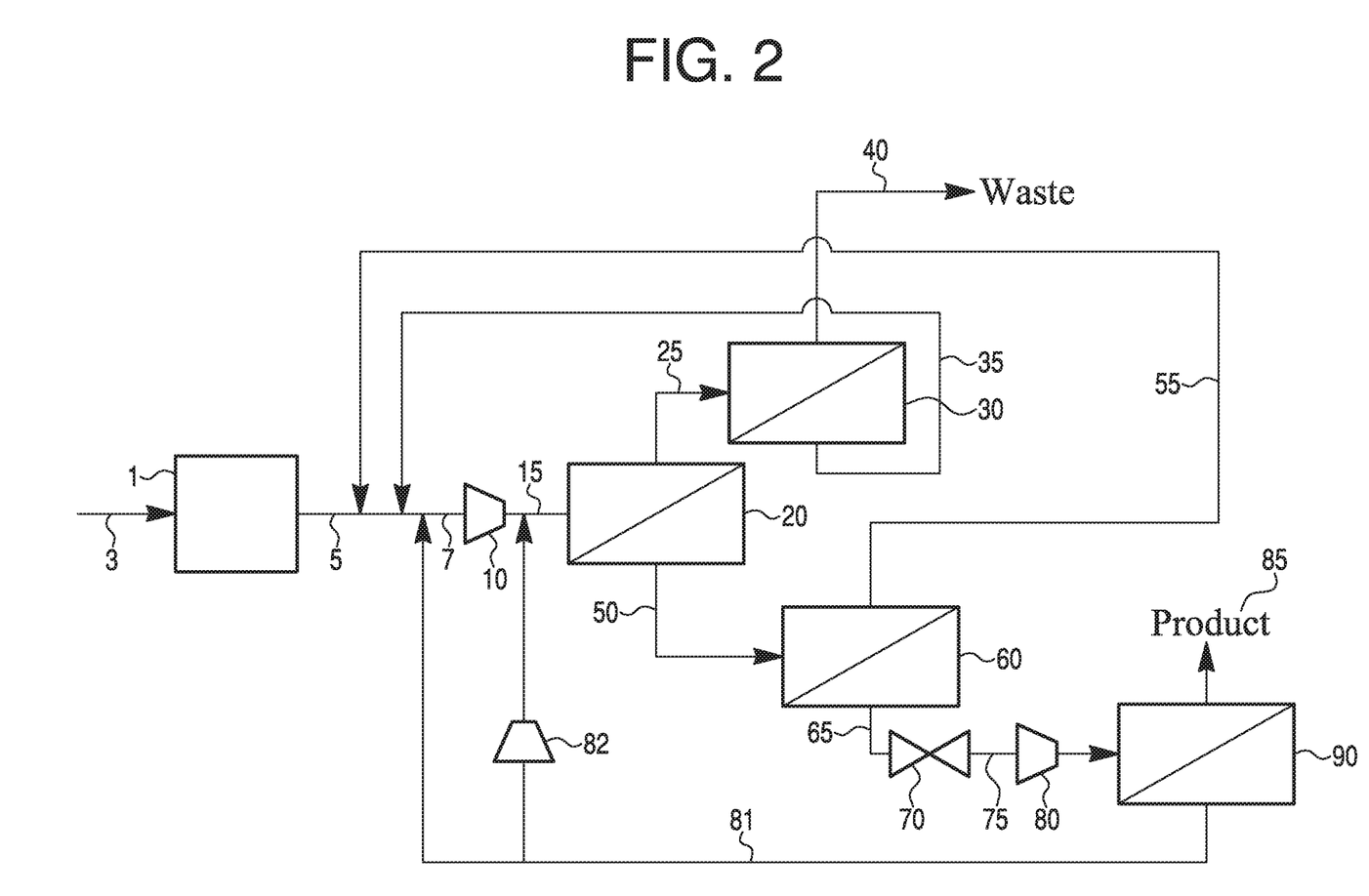
FIG. 2 is a schematic of another embodiment of removal of nitrogen from biomethane by a four-stage membrane system.

In an alternative embodiment and as best illustrated in FIG. 2, a biogas feed stream 3 is fed to a pretreatment unit 1 including an inlet, one or more gas purifications apparatuses, and an outlet where amounts of water, VOCs, and $CO_2$ are removed from the biogas feed stream 3 to yield a methane-enriched biogas stream 5. The biogas stream 5 is combined with a second retentate gas stream 55 and a third permeate gas stream 35 and compressed at a compression station 10 to form a biomethane feed stream 15.

The biomethane feed stream 15, which is at a higher pressure than that of the methane-enriched biogas stream 5, second retentate gas stream 55 and third permeate gas stream 35, is fed to a first separation stage 20 including an inlet, one or more gas separation membranes (having a methane/$N_2$ selectivity of at least 1.5), and an outlet. The biomethane feed stream 15 is separated by the first separation stage 20 (via the one or more gas separation membranes) into a first permeate gas stream 50 and a first retentate gas stream 25.

The first permeate gas stream 50 is fed to a second separation stage 60 that includes an inlet, one or more gas separation membranes (having a methane/$N_2$ selectivity of at least 1.5), and an outlet. The first permeate gas stream 50 is separated by the second separation stage 60 into a second permeate gas stream 65 and a second retentate gas stream 55. The backpressure of the second permeate gas stream 65 is controlled with pressure control valve 70. Because the flow rate and/or composition of the second permeate gas stream 65 may vary substantially over time in response to changes in the biogas feed stream 3 and the methane-enriched biogas stream 5, the pressure control valve 70 may be opened by a variable amount by a programmable logic controller (not illustrated) in response to a drop in flow rate or change in the nitrogen concentration of the second permeate gas stream 65 (measured by non-illustrated sensors). The second retentate gas stream 55 constitutes a first low quality biomethane gas stream.

The first retentate gas stream 25 is fed to a third separation stage 30 which includes in inlet, one or more gas separation membranes (having a methane/$N_2$ selectivity of at least 1.5), and an outlet. The first retentate gas stream 25 is separated by the third separation stage 30 into a third permeate gas stream 35 and a third retentate gas stream 40. The third permeate gas stream 35 constitutes a second low quality biomethane gas stream. The third retentate gas stream 40 constitutes a waste gas.

The pressure-regulated second permeate gas stream 75 is compressed by a secondary compressor 80 to provide a feed to a fourth separation stage 90 that includes an inlet, one or more gas separation membranes (having a $N_2$/methane selectivity of at least 1.5), and an outlet. Thus, for the gas pair of methane and $N_2$, in the membranes of the fourth separation stage 90, $N_2$ is the fast gas and methane is the slow gas and $N_2$ permeates across the membrane at a higher rate than does methane. While any gas separation membrane having an N2/methane selectivity of at least 1.5 may be used, typically, the gas separation membrane has a separation layer made of an amorphous perfluorinated polymer. Representative members include but are not limited to: poly[4,5-difluoro-2,2-bis(trifluoromethyl)-1,3-dioxole-co-tetrafluoroethylene] commercially available from E.I. du Pont and Nemours Company as Teflon® AF 1600 and Teflon® AF 2400; and poly(tetrafluoroethylene-co-2,2,4-trifluoro-5-trifluoromethoxy-1,3-dioxole) commercially available from Solvay as Hyflon AD 60 and Hyflon AD 80.

The compressed second permeate gas stream 75 is separated by the fourth separation stage 90 into a $N_2$-enriched fourth permeate gas stream 81 (which constitutes a third low quality biomethane gas stream) and a methane-enriched fourth retentate gas stream 85 (which constitutes the biomethane product gas). The final biomethane product gas 85 contains less than 5% $N_2$ (more typically 4 vol % or less) and at least 94 vol % methane (more typically at least 96 vol %.

Because they contain useful amounts of methane, the second stage permeate gas stream 55 (i.e., the first low quality biomethane gas) and the third stage retentate gas stream 35 (i.e., the second low quality biomethane gas) are recycled to an inlet of the compression station 1 where they are comingled and compressed with the methane-enriched biogas stream 5. The fourth stage permeate gas stream 81 (i.e., the third low quality biomethane gas) also contains useful amounts of methane, so it is compressed by a tertiary compressor 82, combined with the compressed first and second low quality biomethane gases, and fed to the first separation stage 20. Alternatively and depending upon its pressure, the fourth stage permeate gas stream 81 may instead be compressed by one or more compressors of the compression station 10 where it is comingled and compressed with the second stage permeate gas stream 55, the third stage retentate gas stream 35, and the methane enriched biogas stream 5.

PROPHETIC EXAMPLE

A biomethane stream 5 has the following gas composition: less than 0.05 vol % water, 8.01 vol % $N_2$, and 90.49 vol % $CH_4$.

With regard to the reference characters of FIG. 1, the combined biogas stream 5, second retentate gas stream 55, and third permeate gas stream 35 (each at a pressure of 150 psig) are compressed at the compression station 10 to form a biomethane feed stream 15 with a pressure of around 500 psig. Each of the first, second, and third separation stages 20, 60, 30 includes rubbery-type gas separation membranes exhibiting a methane/$N_2$ selectivity of 3. The second stage permeate gas stream 75 is compressed by the secondary compressor 80 to produce a final biomethane product gas 85 at a pressure of 800 psig. As seen in Table 1, the $N_2$ content is reduced by the prophetic example from 8.01 vol % down to 3 vol % while achieving a methane recovery (calculated as the amount of methane in the biomethane product gas 85 recovered from biogas stream 5) of 96.70%.

TABLE 1

| | Stream | | | | | | | | | |
|---|---|---|---|---|---|---|---|---|---|---|
| | 5 | 7 | 15 | 25 | 50 | 40 | 35 | 55 | 65 | 85 |
| Temperature (° F.) | 77 | 77 | 77 | 67 | 77 | 50 | 68 | 72 | 77 | 120 |
| Pressure (psig) | 150 | 150 | 500 | 490 | 154 | 480 | 150 | 150 | 15 | 800 |

TABLE 1-continued

| | Stream | | | | | | | | | |
|---|---|---|---|---|---|---|---|---|---|---|
| | 5 | 7 | 15 | 25 | 50 | 40 | 35 | 55 | 65 | 85 |
| Flow, MM SCFD | 4.88 | 15.66 | 15.66 | 7.92 | 7.74 | 0.41 | 7.51 | 3.27 | 4.47 | 4.47 |
| Flow, SCFM | 3389 | 10875 | 10875 | 5501 | 5375 | 283 | 5217 | 2269 | 3106 | 3106 |
| Composition, Mol % | | | | | | | | | | |
| $CH_4$ | 90.49 | 88.01 | 88.01 | 83.32 | 92.80 | 36.01 | 85.88 | 89.16 | 95.47 | 95.47 |
| $N_2$ | 8.01 | 10.88 | 10.88 | 15.71 | 5.93 | 62.91 | 13.15 | 9.95 | 3.00 | 3.00 |
| $CO_2$ | 1.00 | 0.44 | 0.44 | 0.19 | 0.70 | 0.00 | 0.20 | 0.17 | 1.09 | 1.09 |
| $O_2$ | 0.50 | 0.67 | 0.67 | 0.78 | 0.56 | 1.08 | 0.77 | 0.71 | 0.45 | 0.45 |
| $H_2O$ | Dry | Dry | Dry | Dry | Dry | Dry | Dry | Dry | Dry | Dry |
| HHV (BTU/SCF) | 907 | 882 | 882 | 835 | 930 | 361 | 861 | 894 | 957 | 957 |
| Recovery= | 96.70 | | | | | | | | | |

The invention claimed is:

1. A method for purifying biogas, comprising the steps of: pretreating a biogas feed stream so as to remove amounts of water, VOCs, and CO2 from the biogas feed stream to produce a methane-enriched biogas stream that comprises methane, $CO_2$, $O_2$, and at least 5 vol % $N_2$;
separating a biomethane feed stream at a first separation stage into a first permeate gas stream comprising at least 90 vol % $CH_4$ and less than 8 vol % $N_2$ and a first retentate gas stream comprising at least 10 vol % $N_2$, the first separation stage comprising at least one polymeric gas separation membrane selective for methane over $N_2$;
separating said first permeate gas stream at a second separation stage comprising at least one polymeric gas separation membrane into a second permeate gas stream comprising at least 94 vol % $CH_4$ and less than 5 vol % $N_2$ and a second retentate gas stream comprising at least 7 vol % $N_2$, the second separation stage comprising at least one polymeric gas separation membrane selective for methane over $N_2$;
separating said first retentate gas stream at a third separation stage comprising at least one polymeric gas separation membrane into a third permeate gas stream comprising at least 80 vol % $CH_4$ and less than 20 vol % $N_2$ and a third retentate gas stream comprising at least 40 vol % $N_2$, the third separation stage comprising at least one polymeric gas separation membrane selective for methane over $N_2$;
feeding said methane-enriched biogas stream, second retentate gas stream and third permeate gas stream to a compression station comprising one or more compressors where they are combined and compressed to form the biomethane feed stream; and
withdrawing said second permeate gas stream as biomethane product gas.

2. The method of claim 1, further comprising the step of compressing said biomethane product gas in a secondary compressor.

3. The method of claim 1, wherein said methane-enriched biogas stream comprises at least 85 vol % methane and impurities comprising at least 5 vol % and up to 15 vol % $N_2$, a non-zero amount of $O_2$ up to 1 vol % $O_2$; a non-zero amount of $CO_2$ but less than 2 vol %; no more than 0.05 wt. % water, and less than 100 ppm each of $H_2S$ and VOCs.

4. The method of claim 1, wherein at least one of said at least one membrane of said first, second and third separation stages is comprised of a porous polymeric substrate having at least one separation layer, wherein said substrate is selected from the group consisting of polyimides, poly sulfones, polyether ether ketones, and mixtures thereof.

5. The method of claim 4, wherein said substrate is polyether ether ketones.

6. The method of claim 4, wherein said at least one separation layer is made of a copolymer or block polymer of the formula:

where PA is an aliphatic polyamide having 6 or 12 carbon atoms and PE is either poly(ethylene oxide) or poly(tetramethylene oxide).

7. The method of claim 4, wherein said separation layer is a polymer made of repeating units of the following monomers:

8. The method of claim 4, wherein said separation layer is a copolymer or block polymer made up of monomeric units of dimethylsiloxane, methylhexylsiloxane, methylphenylsiloxane, methyloctylsiloxane, or combinations thereof.

9. The method of claim 4, wherein said separation layer is a polymer made up of monomeric units of tetramethylene oxide, propylene oxide, ethylene oxide, or combinations thereof.

10. The method of claim 1, wherein each of said at least one membrane of said first, second and third separation stages has a $CH_4/N_2$ selectivity of 1.5 to 5.5.

11. The method of claim 1, wherein a pressure differential between said biomethane feed stream and said first permeate gas stream is at least 100 psig.

12. The method of claim 11, wherein said pressure differential is at least 150 psig.

13. The method of claim 1, wherein said first permeate gas stream comprises at least 92 vol % methane, less than 1 vol % carbon dioxide, less than 7 vol % nitrogen, and less than 0.05 wt. % water.

14. The method of claim 1, further comprising the step of liquefying the biomethane product gas.

15. The method of claim 1, wherein said first retentate gas comprises at least 80 vol % methane, less than 20 vol % nitrogen, less than 0.5 vol % $CO_2$, and less than 0.05 wt. % water.

16. The method of claim 1, further comprising the step of flaring said third retentate gas stream.

17. The method of claim 1, further comprising the step of oxidizing the third retentate gas stream in a thermal oxidizer.

18. The method of claim 1, further comprising the step of using the third retentate stream as a fuel in an internal combustion engine.

19. The method of claim 1, wherein said biomethane product gas includes $N_2$ at a concentration of no more than 3 vol %, CO2 at a concentration of less than 2 vol %, and $H_2O$ at a concentration of less than 0.01 wt. %.

20. A method for purifying biogas, comprising the steps of:
pretreating a biogas feed stream so as to remove amounts of water, VOCs, and CO2 from the biogas feed stream to produce a methane-enriched biogas stream that comprises methane, $CO_2$, $O_2$, and at least 5 vol % $N_2$;
separating a biomethane feed stream at a first separation stage into a first permeate gas stream comprising at least 90 vol % $CH_4$ and less than 8 vol % $N_2$ and a first retentate gas stream comprising at least 10 vol % $N_2$, the first separation stage comprising at least one polymeric gas separation membrane selective for methane over $N_2$;
separating said first permeate gas stream at a second separation stage comprising at least one polymeric gas separation membrane into a second permeate gas stream comprising at least 94 vol % $CH_4$ and less than 5 vol % $N_2$ and a second retentate gas stream comprising at least 7 vol % $N_2$, the second separation stage comprising at least one polymeric gas separation membrane selective for methane over $N_2$;
separating said first retentate gas stream at a third separation stage comprising at least one polymeric gas separation membrane into a third permeate gas stream comprising at least 80 vol % $CH_4$ and less than 20 vol % $N_2$ and a third retentate gas stream comprising at least 40 vol % $N_2$, the third separation stage comprising at least one polymeric gas separation membrane selective for methane over $N_2$;
compressing the second stage permeate gas stream;
separating said compressed second stage permeate gas stream at a fourth separation stage comprising at least one glassy gas separation membrane, each having a $N_2$/methane selectivity of at least 1.5, into a fourth permeate gas stream and fourth retentate gas stream;
feeding said methane-enriched biogas stream, second retentate gas stream, third permeate gas stream, and fourth permeate gas stream to a compression station comprising one or more compressors where they are combined and compressed to form the biomethane feed stream; and
withdrawing said fourth retentate gas stream as biomethane product gas.

21. A system for purifying biogas, comprising:
a pretreatment system comprising an inlet, an outlet, and one or more gas purification apparatuses adapted and configured to remove amount of water, VOCs, and $CO_2$ from a biogas feed stream;
a compression station, comprising an inlet, one or more compressors, and an outlet, the inlet of the compression station being in fluid communication with said pretreatment unit outlet;
a first separation stage comprising an inlet, a permeate outlet, a retentate outlet, and one or more gas separation membranes having a methane/$N_2$ selectivity of at least 1.5, the inlet of the first separation stage being in fluid communication with the main compressor outlet and receiving a compressed biomethane feed stream therefrom, the first separation stage being adapted and configured to separate the compressed biomethane feed stream into a first permeate gas stream and a first retentate gas stream;
a second separation stage comprising an inlet, a permeate outlet, a retentate outlet, and one or more gas separation membranes having a methane/$N_2$ selectivity of at least 1.5, the inlet of the second separation stage being in fluid communication with the permeate outlet of the first separation stage and receiving the first permeate gas stream therefrom, the second separation stage being adapted and configured to separate the first permeate gas stream into a biomethane product gas and a first low quality biomethane gas stream; and
a third separation stage comprising an inlet, a permeate outlet, a retentate outlet, and one or more gas separation membranes having a methane/$N_2$ selectivity of at least 1.5, the inlet of the third separation stage being in fluid communication with the retentate outlet of the first separation stage and receiving the first retentate gas stream therefrom, the third separation stage being adapted and configured to separate the first retentate gas stream into a second low quality biomethane gas stream and a waste gas, wherein the compression station is adapted and configured to comingle and compress the first and second low quality biomethane gas streams with a methane-enriched biogas stream, thereby providing the compressed biomethane feed stream that is fed to the inlet of the first separation stage.

22. The system of claim 21, wherein said at least one membrane of said first, second or third separation stage has a separation layer made of a copolymer or block polymer of the formula:

where PA is an aliphatic polyamide having 6 or 12 carbon atoms and PE is either poly(ethylene oxide) poly(tetramethylene oxide).

23. The system of claim 21, wherein said at least one membrane of said first, second or third membrane stage has a separation layer made of repeating units of the following monomers:

24. The system of claim 21, wherein said at least one membrane of said first, second or third separation stage has a separation layer made of a copolymer or block polymer of dimethylsiloxane, methyloctylsiloxane, tetramethylene oxide, propylene oxide, and/or ethylene oxide.

25. The system of claim 21, wherein said at least one membrane of said third separation stage is comprised of cellulose acetate, a polysulfone, or a polyimide.

26. The system of claim 21, wherein each of said at least one membrane of said first separation stage has a separation layer that is supported by a support layer made of a polyimide, polysulfone, polyether ether ketone, or mixtures thereof.

27. The system of claim 26, wherein each of said support layers is porous and is made of polyether ether ketone.

28. The system of claim 21, wherein the one more gas purification apparatuses comprise:
- a fourth separation stage comprising an inlet, a permeate outlet, a retentate outlet, and one or more gas separation membranes having a $CO_2$/methane selectivity of at least 10; and
- a fifth separation stage comprising an inlet, a permeate outlet, a retentate outlet, and one or more gas separation membranes having a $CO_2$/methane selectivity of at least 10, the inlet of the main compressor being in fluid communication with the retentate outlet of the fifth separation stage.

29. A system for purifying biogas, comprising:
- a pretreatment system comprising an inlet, an outlet, and one or more gas purification apparatuses adapted and configured to remove amount of water, VOCs, and CO2 from a biogas feed stream;
- a compression station, comprising an inlet, one or more compressors, and an outlet, the inlet of the compression station being in fluid communication with said pretreatment unit outlet;
- a first separation stage comprising an inlet, a permeate outlet, a retentate outlet, and one or more gas separation membranes having a methane/$N_2$ selectivity of at least 1.5, the inlet of the first separation stage being in fluid communication with the main compressor outlet and receiving a compressed biomethane feed stream therefrom, the first separation stage being adapted and configured to separate the compressed biomethane feed stream into a first permeate gas stream and a first retentate gas stream;
- a second separation stage comprising an inlet, a permeate outlet, a retentate outlet, and one or more gas separation membranes having a methane/$N_2$ selectivity of at least 1.5, the inlet of the second separation stage being in fluid communication with the permeate outlet of the first separation stage and receiving the first permeate gas stream therefrom, the second separation stage being adapted and configured to separate the first permeate gas stream into a second permeate gas stream and a first low quality biomethane gas stream;
- a third separation stage comprising an inlet, a permeate outlet, a retentate outlet, and one or more gas separation membranes having a methane/$N_2$ selectivity of at least 1.5, the inlet of the third separation stage being in fluid communication with the retentate outlet of the first separation stage and receiving the first retentate gas stream therefrom, the third separation stage being adapted and configured to separate the first retentate gas stream into a second low quality biomethane gas stream and a waste gas; and
- a fourth separation stage comprising an inlet, a permeate outlet, a retentate outlet, and one or more gas separation membranes having a $N_2$/methane selectivity of at least 1.5, the inlet of the fourth separation stage being in fluid communication with the permeate outlet of the second separation stage and receiving the second permeate gas stream therefrom, the fourth separation stage being adapted and configured to separate the second permeate gas stream into a biomethane product gas and a third low quality biomethane gas stream, wherein the compression station is adapted and configured to comingle and compress the first, second, and third low quality biomethane gas streams with a methane-enriched biogas stream, thereby providing the compressed biomethane feed stream that is fed to the inlet of the first separation stage.

* * * * *